April 6, 1954                P. D. MIZE                    2,674,138
                DRILLING, BORING, OR OTHER MACHINE
Filed April 30, 1952                              2 Sheets-Sheet 1
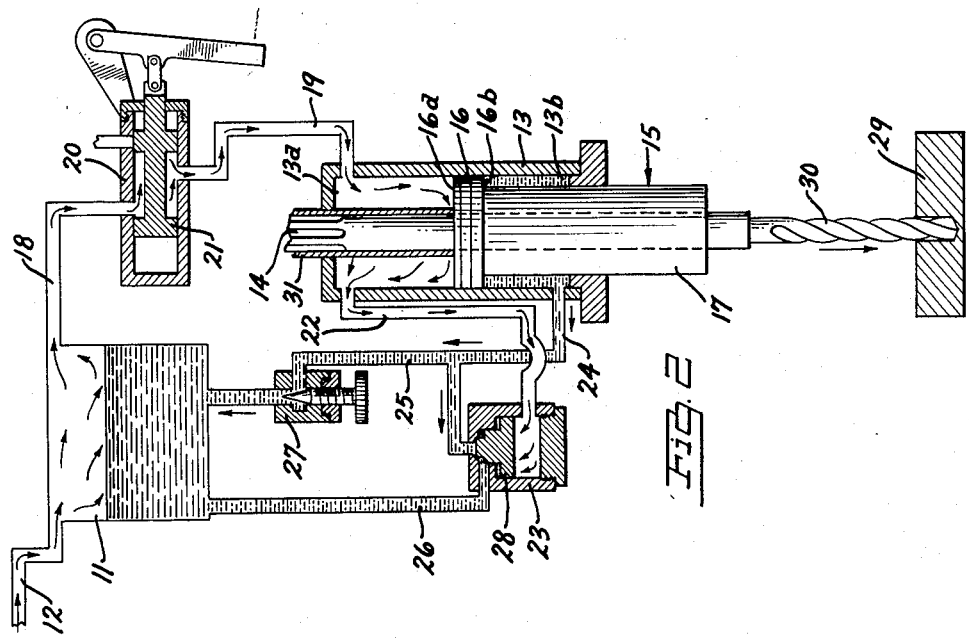
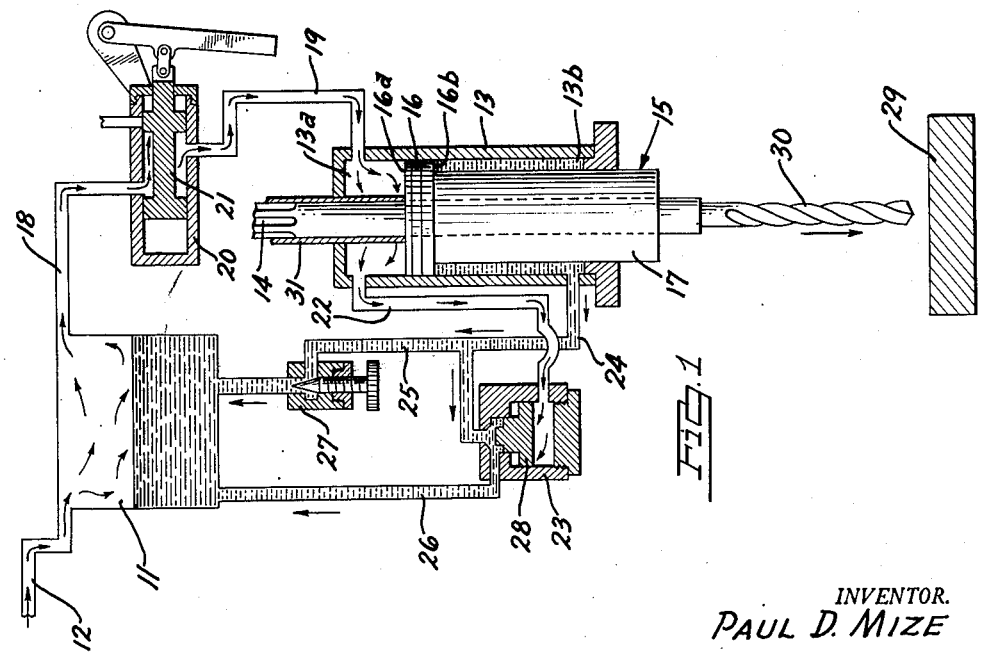
INVENTOR.
PAUL D. MIZE
BY John Joseph Roethel
ATTORNEY April 6, 1954  P. D. MIZE  2,674,138
DRILLING, BORING, OR OTHER MACHINE
Filed April 30, 1952  2 Sheets-Sheet 2
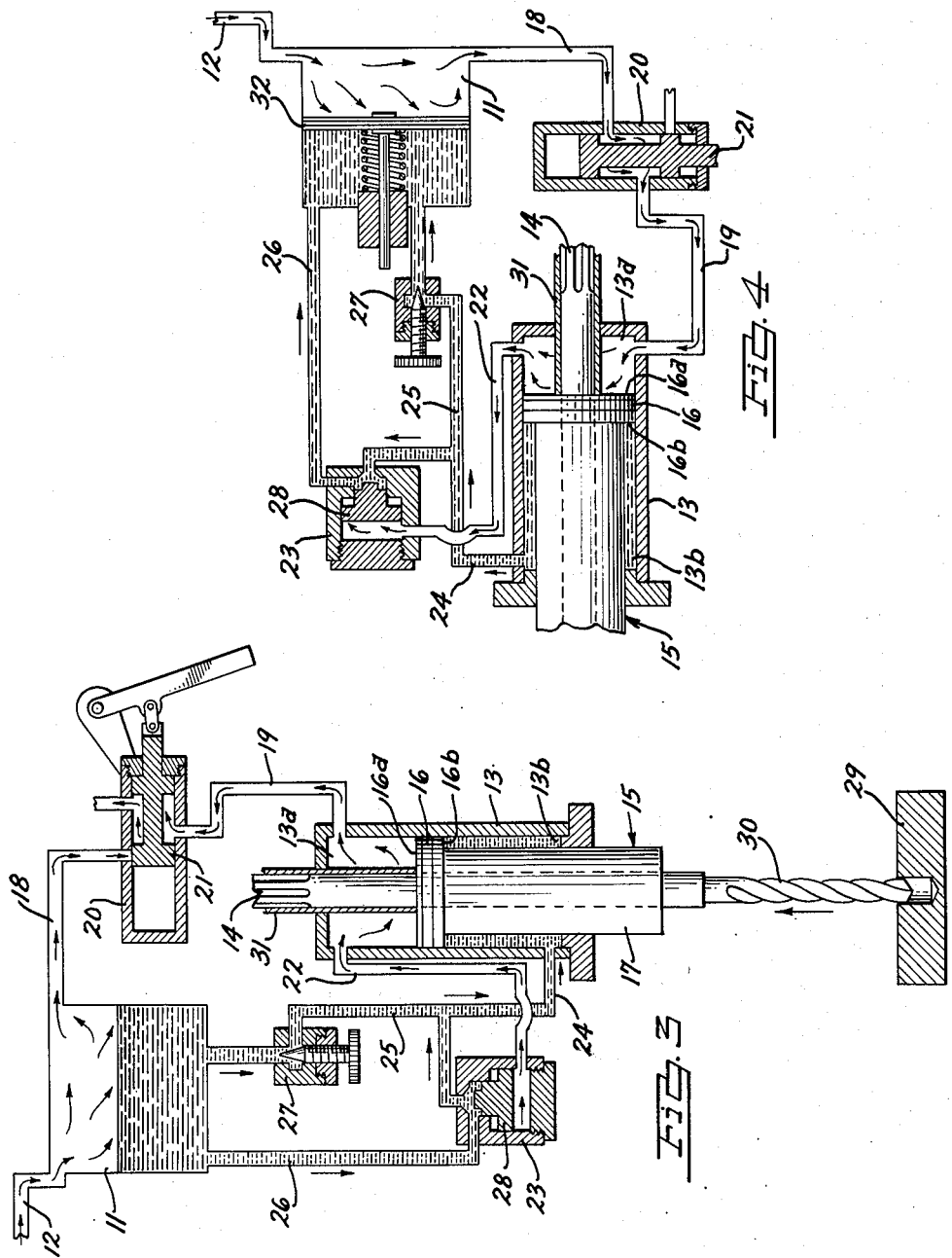
INVENTOR.
PAUL D. MIZE
BY John Joseph Roethel
ATTORNEY Patented Apr. 6, 1954

2,674,138

UNITED STATES PATENT OFFICE 2,674,138

DRILLING, BORING, OR OTHER MACHINE

Paul D. Mize, Detroit, Mich.

Application April 30, 1952, Serial No. 285,190

9 Claims. (Cl. 77—33.5)

This invention relates to power operated machine tools and more particularly to an improved method and means for controlling the traverse of a drilling, boring or other tool toward and from the workpiece and for controlling the cutting rate or feed of the tool during the drilling, boring or other operation.

Few machine operators are manually able to control a drilling, boring or other machine with the efficiency and preciseness of operation necessary to produce a high rate of production and to maintain high quality workmanship. Depending on the kind of material being drilled, bored or otherwise being worked, the size of the tool being used and the speed of rotation of the machine spindle, there is generally one cutting feed rate that will give the optimum results. When manually controlled, the cutting feed rate is subject to wide variations from the desired norm particularly when the same operation has to be repeated a number of times. Accordingly, it is an object of the present invention to provide an improved construction and arrangement for controlling the traverse of the drilling, boring or other tool toward and from the workpiece and for controlling the cutting feed of the tool during the drilling, boring or other operation, which improved construction and arrangement does not depend on the manual skill of the machine operator to produce the desired result.

In the conventional manually operable drilling, boring or other machine the machine spindle is operatively associated with a quill in such a manner that the spindle while being rotatable relative to the quill is axially bodily shiftable therewith, the quill generally being operatively movable through a rack and pinion mechanism. In its illustrated embodiments the present invention comprises an improved construction and arrangement wherein the quill controlling the axial movement of the spindle is in the form of a piston movable within a cylindrical portion of the machine head, said piston having a portion subjected on one side thereof to air under pressure and on the other side thereof to liquid under pressure, the pressure forces being in opposition to each other and the differential between the two pressure forces determining the direction and rate of axial movement of the piston and the spindle of the machine and therefore the direction and rate of axial movement of the cutting tool, suitable valve means being provided to control the air and liquid flow to and from the cylinder. In the illustrated embodiments the valve means controlling the liquid flow comprises two separate valves located in parallel conduits leading from the cylinder to a reservoir, one of said valves being a metering valve and the other being a piston type valve adapted to be in either a fully opened or closed position, said piston type valve being constructed and arranged to be acted upon at opposite ends by air and liquid pressure forces, the differential between the two pressure forces determining whether the valve is in opened or closed position relative to the liquid flow conduit in which it is located, and the opened or closed position of this valve being determinative of the rate of axial movement of the cutting tool, since with this valve closed the liquid can only flow from the cylinder to the reservoir at the rate permitted by the setting of the metering valve.

Other features and objects of the present invention will appear in the following description and appended claims, reference being had to the accompanying drawings forming a part of this specification wherein like reference characters designate corresponding parts in the several views.

Fig. 1 is a diagrammatic view partly in section illustrating one embodiment of the present invention in one condition of operation.

Fig. 2 is a diagrammatic view in part similar to Fig. 1 illustrating the present invention in a second condition of operation.

Fig. 3 is a diagrammatic view in part similar to Figs. 1 and 2 illustrating the present invention in a third condition of operation.

Fig. 4 is a diagrammatic view partly in section illustrating a second embodiment of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings the invention is illustrated in diagrammatic form in order that the important features may be described without the confusion inherent in excessive detail. As illustrated in Figs. 1 to 3 inclusive, the construction and arrangement embodied in the present invention comprises a chamber or reservoir 11 which preferably would be located within the framework of the head portion of a drilling, boring or tapping machine. The chamber or reservoir 11 is adapted to hold a quantity of liquid and as illustrated is shown about one-half full of oil. Most machine shops and factories are piped for air under pressure from a centrally located air compressor, the air pressure generally being about 100 p. s. i. A conduit 12 adapted to be connected to such a source of air under pressure is shown at the upper portion of the chamber or reservoir 11. The air under pressure introduced into chamber or reservoir 11 through conduit 12 exerts a pressure on the liquid in the reservoir for a purpose to be hereinafter explained. As also will be explained in detail, the chamber or reservoir 11 is also connected by conduit and valve systems to a cylinder 13 forming a part of the machine head.

In the conventional manually operable drilling, boring or other machine, the machine spindle is operatively associated with a quill in such a manner that the spindle while being rotatable relative to the quill is movable axially therewith, the quill generally being operatively movable through a rack and pinion mechanism. In the present invention, the spindle 14 is shown in operative relationship to a quill 15, it being understood that the spindle 14 and quill 15 are operatively associated with each other in any conventional manner whereby the spindle is rotatable relative to the quill while at the same time being bodily shiftable along an axial direction therewith. It will also be understood that the spindle 14 is splined to a sheave for rotation thereby in a manner well known to the art. The foregoing explanation is deemed sufficient since those features of construction form no part of the present invention.

The quill 15 in the present invention is in the form of a piston having a head portion 16 equal in diameter to the bore of the cylinder 13 and a body portion 17 of lesser diameter. One end 13a of the cylinder 13, the upper end as viewed in Figs. 1 to 3 inclusive, is connected by suitable conduit sections 18 and 19 to the upper portion of the chamber or reservoir 11, the conduit sections 18 and 19 being coupled to each other through a piston type valve 20. The piston 21 of the valve 20 is illustrated as being shiftable to provide a passageway for air under pressure to flow from conduit 18 to conduit 19 (Figs. 1 and 2) and then into the upper end 13a of the cylinder 13 or to permit air to be exhausted from the upper end 13a of the cylinder 13 through conduit 19 to the atmosphere (Fig. 3). The upper end 13a of the cylinder 13 is connected by a conduit 22 to a second piston type valve 23 for a purpose to be hereinafter explained.

The lower end 13b of the cylinder 13 has connected thereto a conduit 24 which divides into two branches 25 and 26, each of which terminates at the lower or liquid containing portion of the chamber or reservoir 11. The conduit 25 has inserted therein a metering or needle valve 27 which is adjustable to provide any desired rate of flow. The conduit 26 directs the liquid flowing through it through the aforementioned piston valve 23. The piston 28 of the piston valve 23 is free floating within the valve body and is subjected at one end, the lower end as viewed in Figs. 1 to 3 inclusive, to air pressure from the conduit 22 and at its upper end to the liquid pressure within the conduit 26, the pressure differential between the air and liquid pressures being determinative as to whether the valve is open as in Figs. 1 and 3 thereby permitting liquid flow in conduit 26 or closed as in Fig. 2 thereby not permitting any flow in conduit 26.

Referring to Fig. 1, it will be assumed that it is desired to drill a hole in a workpiece 29 which has been properly positioned, for example, under a drill 30 suitably chucked to the lower end of the spindle 14. It is immaterial to the present invention whether the machine spindle is rotating before engaging the work surface or is started to rotate upon coming in contact with the work surface. The piston 21 of the valve 20, which after the completion of the prior drilling operation is in the position shown in Fig. 3, is shifted to connect conduits 18 and 20 thereby admitting air under pressure to the end 13a of the cylinder 13. The effective area of the side 16a of piston head 16 against which the air pressure is exerted is substantially equal to the piston head area less the cross sectional area of the sleeve 31 housing the upper portion of the spindle. It will be noted that the effective area of the side 16b of the piston head 16 with which the liquid or oil in the cylinder is in contact is equal to the area of the piston less the cross sectional area of the quill body 17, therefore the effective area of the side 16b is substantially less than that of the side 16a. The respective effective areas are such that the force resulting from the air pressure is sufficient to overcome the resistant force of the liquid pressure and thus force the liquid through conduit 22 toward the chamber or reservoir 11 against the pressure of the air on the liquid surface. At the stage shown in Fig. 1 the liquid flowing from conduit 24 is flowing toward chamber 11 through conduit branches 25 and 26. At this stage the downward movement of the tool 30 toward the workpiece is relatively rapid inasmuch as the valve 23 permits a rapid discharge of the liquid or oil through the conduit 26. The piston 28 of the valve 23 has been described as being subjected to the opposed pressures of the air in conduit 22 and the liquid in conduit 26. It will be noted that the effective area of the piston surface in contact with the liquid in conduit 26 is somewhat less than the effective area of the piston surface in contact with the air coming from conduit 24. These effective areas have been so selected that during the free downward traverse of the drill toward the workpiece the force tending to maintain the piston 28 in open position and thereby to permit the flow of liquid in conduit 26 is greater than the force tending to urge the piston 28 into position to close conduit 26. It will be readily understood that because of the expanding volume of the cylinder space above the piston head 16 as the quill 15 moves downwardly the air pressure in conduit 22 will be substantially less than that in conduit 19.

As soon as the drill 30 engages the surface of the workpiece 29 the free movement of the piston 15 in the cylinder 13 is retarded. Upon the drill engaging the workpiece surface not only does the rate of volumetric expansion of the space above the piston head 16 decrease permitting a pressure buildup in this space as well as in the conduit 22 but also the rate of volumetric contraction of the space under the piston head 16 decreases permitting a pressure fall off in this space as well as in the conduit 24 and its branches 25 and 26. Immediately upon the air pressure in conduit 22 increasing and the liquid pressure in conduit 26 decreasing, the force tending to move piston 28 in valve 23 into closing position relative to conduit 26 is sufficient to overcome the force of the liquid pressure tending to maintain the piston 28 in open position and the valve closes as shown in Fig. 2. Accordingly, the only way through which liquid can escape from the underside 16b of piston head 16 is through branch conduit 25 and the rate of flow through this conduit is limited by the metering valve 27. The degree of opening of metering valve 27 thus determines the cutting feed of the tool or, as illustrated, the drill.

To retract the drill, the machine operator need only shift piston 21 in valve 20 to shut off the air pressure coming through conduit 18 and permit the upper end 13a of cylinder 13b to exhaust through conduit 19 to the atmosphere as shown in Fig. 3. Piston 28 in valve 23 will immediately open permitting oil under pressure to flow rapidly through conduit 26 from the reservoir 11 into the lower end 13b of the cylinder 13 and thereby raise the quill 15 and the spindle 14, thus retracting the tool 30 from the workpiece 29.

In the embodiment of the invention illustrated in Fig. 4, the liquid and air in the chamber 11 are shown separated by a spring loaded diaphragm 32. The use of the diaphragm permits the pressure of the air to be transmitted to the oil without being in contact therewith thus permitting the machine head or the chamber or reservoir 11 to be tilted from the position shown in Figs. 1 to 3 inclusive without disturbing the effective relationship between the liquid and air in the chamber but otherwise has no important effect on the mode of operation embodied in the present invention.

Thus, the present invention embodies a construction and arrangement which will efficiently and effectively control the cutting feed of a drilling, boring or other tool. Yet the control of the cutting feed does not occur until the tool actually reaches the surface of the workpiece thus using the workpiece itself as the guage initiating the change of the rate of axial movement of the machine spindle from relatively rapid traverse to cutting feed rate. Further, the metering valve once set ensures the preciseness of the cutting operation irregardless of how many times it must be repeated, thus ensuring longer tool life and higher quality production.

I claim:

1. In a machine tool, a chamber partially filled with liquid and adapted to be connected to a source of air under pressure, a cylinder, a combination quill and piston axially slidable within said cylinder, a tool holding spindle rotatable within said quill and bodily displaceable therewith, air conduit means connecting the air filled portion of said chamber with one end of said cylinder, and liquid conduit means connecting the liquid filled portion of said chamber with the other end of said cylinder, the piston portion of said combination quill and piston having one surface thereof in contact with the air and an opposite surface in contact with the liquid, the effective area of said one surface being greater than the effective area of said opposite surface whereby the force exerted by the air pressure is sufficient to overcome the resistant force of the liquid pressure and cause axial movement of the quill and spindle and also the liquid to be discharged from said cylinder, said liquid conduit means including a metering valve and a second valve in parallel therewith, said second valve being responsive to changes in the force differential between said air and liquid pressures and being adapted at a predetermined force differential to change from an open to a closed position thereby to force all the liquid being discharged from said cylinder to pass only through the metering valve.

2. A machine tool comprising a main tool head including a cylinder, an axially slidable quill within said cylinder, a spindle rotatable within said quill and bodily displaceable therewith, a tool carried by said spindle, an air conduit means connected at one end to a source of air under pressure and at its other end to one end of said cylinder, a liquid conduit means connected at one end to a source of liquid under pressure and at its other end to the other end of said cylinder, said quill having a part thereof one surface of which is in contact with the air under pressure and the opposite surface of which is in contact with the liquid under pressure, the effective area of said one surface being greater than the effective area of said opposite surface whereby the force exerted by the air under pressure is sufficient to overcome the resistant force of the liquid under pressure and cause axial movement of the quill and spindle toward a workpiece and also the discharge of said liquid from said cylinder, the rate of movement of said quill and spindle being governed by the rate of liquid discharge from said cylinder, said liquid conduit means including parallel branch conduits one of which has a metering valve therein and the other of which has a valve responsive to changes in the force differential between said air and liquid pressures, said last mentioned valve being adapted upon the change in the force differential between said air and liquid pressure means upon the addition to the latter of the resistant force resulting from the engagement of the tool with the workpiece to prevent the flow of liquid through its branch conduit and thereby restrict the flow to a predetermined rate as set by the metering valve.

3. The method of controlling the axial movement of a machine tool spindle which is rotatably mounted in a quill and is bodily shiftable therewith, said quill being confined within a cylinder, which comprises exerting air and liquid pressure on opposed surfaces respectively of said quill so that the product of the air pressure and the area of the surface against which it acts will produce a force sufficient to overcome the opposing force resulting from the product of the liquid pressure and the area of the surface against which it acts and cause axial movement of said quill and spindle at a predetermined rate, the liquid within the confines of the cylinder being permitted to discharge therefrom through at least two branches of a discharge conduit at a relatively rapid rate during the traverse of the tool toward the workpiece, the force due to the resistance of the tool encountering the workpiece being added to the force due to the liquid pressure thereby to retard the rate of volumetric expansion of the air space in the cylinder and increase the air pressure within said space while at the same time decreasing the rate of volumetric contraction of the liquid space in said cylinder and decrease the discharge pressure of the liquid, and utilizing the new force differential to cut off the flow of liquid through one of the branch conduits while controlling the liquid discharge at a predetermined regulated rate through the other of said branch conduits thus affecting the rate of axial movement of said quill and spindle.

4. In a machine tool, a first fluid pressure means for moving a tool in one direction, a second fluid pressure means resisting movement of said tool in said one direction, said second fluid fluid pressure means including a discharge conduit having two parallel branches, one of said branches having a metering valve therein and the other of said branches having a pressure responsive valve therein, said metering valve being adjustable to regulate the flow of fluid through said one branch and said pressure responsive valve being adapted to permit either flow or no flow of fluid through said other branch, said pressure responsive valve normally permitting fluid to flow therethrough, means connecting said pressure responsive valve to said first fluid pressure means so that said pressure responsive valve will cut off the flow of fluid through said other branch upon an increase of the pressure exerted by said first fluid pressure means due to the increase in resistance to movement of the tool in said one direction upon the same engaging a workpiece.

5. In a machine tool, a first fluid pressure means for moving a tool in one direction, a second fluid pressure means resisting movement of said tool in said one direction, the rate of movement of said tool being proportional to the force differential between the two fluid pressure means, said second fluid pressure means including a discharge conduit having two parallel branches, one of said branches having a metering valve therein and the other of said branches having a pressure responsive valve therein, said metering valve being adjustable to regulate the flow of fluid through said one branch and said pressure responsive valve being adapted to permit either flow or no flow of fluid through said other branch, said pressure responsive valve normally permitting fluid flow therethrough, means connecting said pressure responsive valve to said first fluid pressure means so that said pressure responsive valve will cut off the flow of fluid through said other branch upon an increase of the pressure exerted by said first fluid pressure means due to the increase in resistance of movement of the tool in said one direction upon the same engaging a workpiece.

6. In a machine tool, air pressure means for moving a tool in one direction, liquid pressure means resisting movement of said tool in said one direction, said liquid pressure means including a discharge conduit having two parallel branches, one of said branches having a metering valve therein adjustable to regulate the rate of flow of the fluid therethrough, the other of said branches having a pressure responsive valve therein normally permitting liquid flow through said other branch, means connecting said pressure responsive valve to said air pressure means so that upon an increase of the pressure thereof to a predetermined pressure said pressure responsive valve will cut off the flow of fluid through said second branch and thus limit the flow of fluid to the branch containing the metering valve.

7. A machine tool including a cylinder means, piston means within said cylinder movable in opposite directions by fluid under pressure, tool means connected to said piston, a source of fluid under pressure, a first conduit means for conveying fluid to and from one end of said cylinder, a second conduit means for conveying fluid to and from the other end of said cylinder, said fluid when being conveyed to said one end of the cylinder through said first conduit means creating a force on the piston sufficient to overcome the resistant force of the fluid in the other end of said cylinder thereby to cause movement of said tool means toward a workpiece and also the discharge of liquid from said other end of the cylinder through said second conduit means, the rate of movement of the tool toward said workpiece being proportional to the rate of discharge of fluid through said second conduit means, said second conduit means including a metering valve in parallel with a pressure responsive valve, the latter normally being in an open condition, means connecting said pressure responsive valve to said one end of said cylinder, said pressure valve being responsive to an increase in pressure in said one end of said cylinder whereby said pressure valve will close and the discharging fluid will be limited to flowing through said metering valve.

8. A machine tool comprising a cylinder means, piston means within said cylinder, means for connecting a tool to said piston means, air conduit means connecting a source of air under pressure to one end of said cylinder, liquid conduit means connecting a source of liquid under pressure to the other end of said cylinder, the effective area of the side of the piston in contact with the air under pressure being greater than the effective area of the side thereof in contact with the liquid under pressure whereby the force resulting from the air pressure is sufficient to overcome the resistant force of the liquid pressure, the differential in said forces resulting in movement of a tool toward a workpiece at a predetermined rate of movement and to cause fluid to be discharged from said cylinder through said liquid conduit means, said liquid conduit means dividing into two parallel branches, one of said branches having a metering valve adjustable to regulate the flow of liquid therethrough, the other of said branches having a pressure responsive valve normally in an open position to permit unobstructed liquid flow therethrough, means connecting said pressure responsive valve to said one end of the cylinder so that in response to an increase of pressure within said one end of the cylinder to a predetermined pressure said pressure responsive valve will close and thereby block the flow of liquid through said other liquid conduit branch and the rate of discharge of said liquid will be determined solely by the flow of fluid through said metering valve.

9. A machine tool comprising a cylinder means, piston means within said cylinder, means for connecting a tool to said piston means, air conduit means connecting a source of air under pressure to one end of said cylinder, liquid conduit means connecting a source of liquid under pressure to the other end of said cylinder, the effective area of the side of the piston in contact with the air under pressure being greater than the effective area of the side thereof in contact with the liquid under pressure whereby the force resulting from the air pressure is sufficient to overcome the resistant force of the liquid pressure, the differential in said forces resulting in movement of a tool toward a workpiece at a predetermined rate of movement and to cause fluid to be discharged from said cylinder through said liquid conduit means, the rate of movement of the tool toward the workpiece being controlled by the rate of discharge of said liquid, and control means for varying the rate of discharge of said liquid, said control means comprising a metering valve and a pressure responsive valve mounted in parallel branches of said liquid conduit means, said metering valve being adjustable to regulate the flow of liquid therethrough and said pressure operated valve being adapted to either permit the flow of liquid therethrough at a fixed rate or restrict such such flow in its entirety, said pressure responsive valve normally being in an open position, means connecting said pressure responsive valve to said one end of the cylinder, said pressure responsive valve upon an increase of pressure within said one end of the cylinder becoming closed and thereby stopping the flow of fluid through said other branch so that the rate of discharge of the liquid will be determined solely by the flow of liquid through said one branch and said metering valve.

References Cited in the file of this patent

UNITED STATES PATENTS

| Number | Name | Date |
| --- | --- | --- |
| 706,688 | Reynders et al. | Aug. 12, 1902 |
| 2,335,809 | Stacy | Nov. 30, 1943 |